United States Patent [19]
Morgan

[11] Patent Number: 4,777,571
[45] Date of Patent: Oct. 11, 1988

[54] CHRISTMAS TREE LIGHTING UTILIZING FIBER OPTICS

[76] Inventor: Clint E. Morgan, 1209 B Palmetto Ave., Ontario, Calif. 91762

[21] Appl. No.: 50,684

[22] Filed: May 18, 1987

[51] Int. Cl.$^4$ .............................................. F21P 3/00
[52] U.S. Cl. ..................................... 362/123; 362/32; 362/806
[58] Field of Search ................. 362/32, 123, 806, 810, 362/811

[56] References Cited

U.S. PATENT DOCUMENTS

| | | | |
|---|---|---|---|
| 2,519,690 | 8/1950 | Recktenwald | 362/123 |
| 3,035,162 | 5/1962 | Emmich | 362/123 |
| 3,564,233 | 2/1971 | Cox | 362/123 |
| 3,721,815 | 3/1973 | Wall | 362/123 |
| 3,766,376 | 10/1973 | Sadacca et al. | 362/123 |
| 3,878,503 | 4/1975 | Martin | 362/123 |
| 3,881,976 | 5/1975 | Jones | 362/122 |
| 4,060,722 | 11/1977 | Foley | 362/123 |
| 4,364,102 | 12/1982 | Huppert et al. | 362/123 |
| 4,425,599 | 1/1984 | Rieder et al. | 362/32 |

*Primary Examiner*—Ira S. Lazarus
*Assistant Examiner*—Sue Hagarman
*Attorney, Agent, or Firm*—Pravel, Gambrell, Hewitt, Kimball & Krieger

[57] ABSTRACT

A basic light source, having an internal high or low intensity light member, and at least a pair of concentric rotating shadow wheels, each of the wheels provided with a plurality of orifices there through for allowing light to course through the wheels. There is further provided an extruded or dipped coating fiber housing, the fiber, housing a plurality of optical fibers therewithin, so that the light source following its having coursed through the wheel, travels through the group of optical fibers contained within the single housing. Further, there is provided means for allowing the various optic fibers to terminate at a fluted plastic molding that includes a base portion for mounting or clipping onto the branch of a tree.

12 Claims, 1 Drawing Sheet

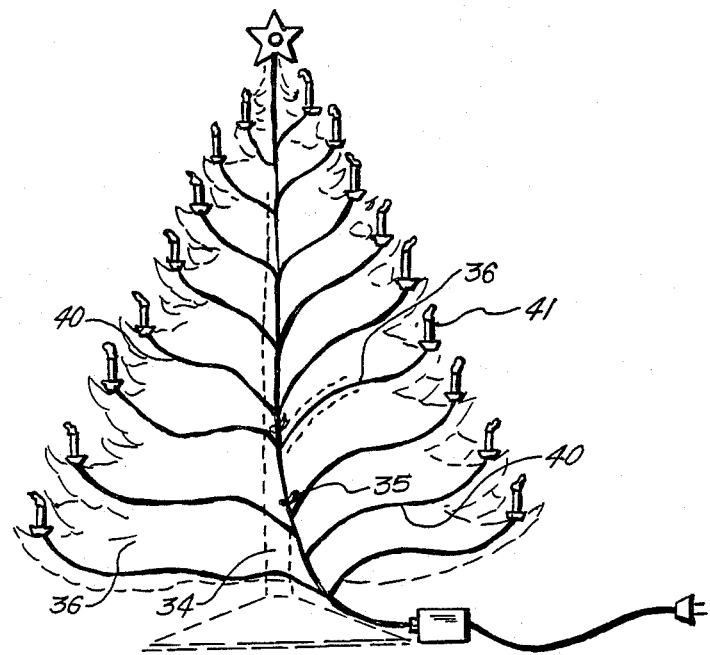
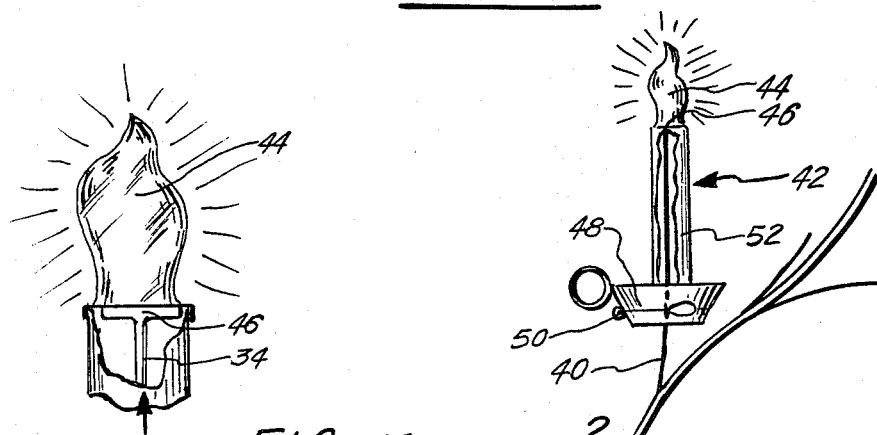
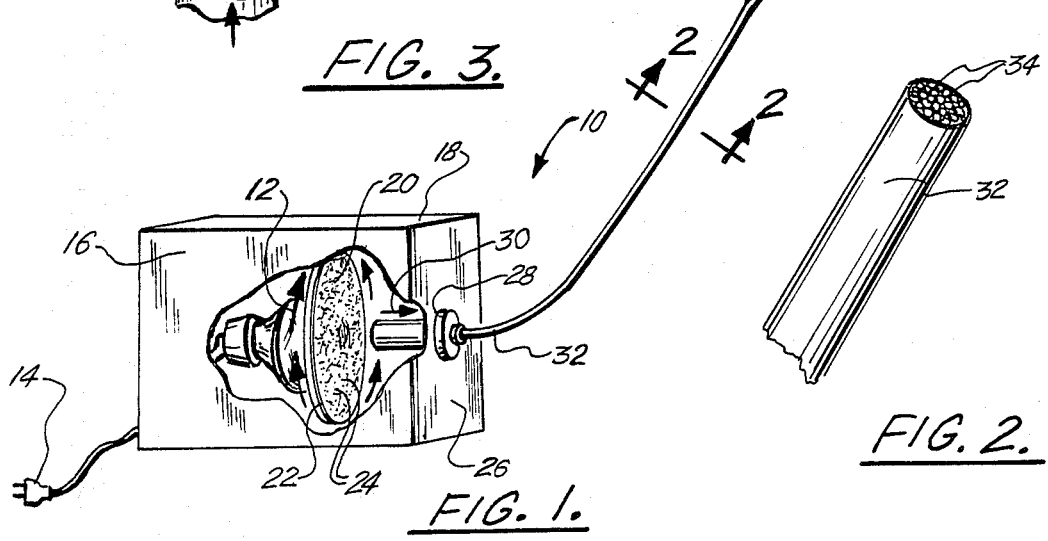

CHRISTMAS TREE LIGHTING UTILIZING FIBER OPTICS

BACKGROUND OF THE INVENTION

1. Field of the Invention

The system of the present invention relates to fiber optics. More particularly, the present invention relates to the illumination of a Christmas tree utilizing optic fibers wherein the aligned end of the fiber optic filaments serve as the point of illumination within the various branches of the tree, and the illumination originates from a single light source away from the tree. There is further included rotating wheels or the like which would provide for the traveling of light through openings of the wheels on an intermediate basis to create a twinkling effect, and may also include colored light to provide for the glowing of the bulbs in a variety of colors.

2. General Background

One of the more fundamental problems in erecting the decorated tree during the Christmas season, is the problem of providing illumination within the tree so as to enhance the effect, and yet avoid risk of fire as the tree becomes dried over the Christmas season. In the present state of the art, the most common way of illuminating trees is to provide a strand of electrically powered lights, which are attached to various branches on the tree, and individual bulbs are lighted to provide the array of light. However, the types of bulbs that are used in most cases become very hot during use, and that coupled with the fact that the tree, over the course of the Christmas season becoming more and more dry due to the lack of moisture, enhances a possibility of fire occurring in the tree either from the overheated bulbs, or from perhaps a short in the wiring that would cause an electrical fire and of course may result in property damage and worse yet, injury or death.

It would therefore be beneficial to provide a lighting source for trees which (a) would accomplish the goal of making the tree highly more decorative in appearance, yet (b) provide a much safer means of illuminating the tree without endangering property and life.

The subject of this patent application addresses one feasible means of accomplishing this through the use of fiber optics. Ornamental lighting employing optic fibers is quite well known. Such items as ornamental lamps, employing a group of optic fibers wherein the fibers are allowed to spray at the free end, creates a cascade effect of lighting the fibers.

Generally, the concept is to have a single source of illumination such as a high intensity light bulb at one end of the fibers, and due to the light conducting property of the fibers, the light is able to travel through each fiber with a minimum of dispersion, and would enhance the appearance of the item.

If this were applied with the use of a Christmas tree, one could well image the illumination that would occur through this type of process.

There are several patents which have addressed this question of Christmas trees being lighted through illumination such as light pipes or optic fibers, the most pertinent being as follows:

U.S. Pat. No. 3,766,376, issued to Sadacca, et al, entitled "Artificial Christmas Tree Illuminated By Optic Fiber Sprays" teaches the illumination of an artificial tree by utilizing a group of optic fibers as substantially the body of the tree, with various branches illuminating into a spray of optic fibers on their ends. There is further provided an internal single light source to create an effect of the illumination.

U.S. Pat. No. 4,060,722, issued to Foley, entitled "Fibre Optics Display", has its primary object to provide a fiber optic system of illuminating artificial Christmas tree which can be protected by storing the delicate filaments along hollow passageways within the tree.

U.S. Pat. No. 4,364,102, issued to Huppert, et al, entitled "Internally Lighted Decorative Display", teaches the use of an internal illuminated optical display utilizing a single source of light placed into a hollow interior. The internal surfaces of the display are covered with light reflective layer of coating which reflects and transmits the light from the light source through the exterior of the display wherein the reflective light is emitted therefrom.

U.S. Pat. No. 2,519,690, issued to Recktenwald, entitled "Artificial Christmas Tree", relates to Christmas tree ornaments that have been adapted to miniature Christmas trees to provide lighted decorations through the use of an internal light source.

U.S. Pat. No. 3,721,815, issued to Wall, entitled "Acylindrical Ornamental Illumination Device and Adapter", enables the illumination of optical fibers sprays without requiring bulk and expensive light source holders can be strung out and draped around the Christmas tree or the like.

U.S. Pat. No. 3,881,976, issued to Jones, entitled "Fiber Bundles For Ornamental Display Devices And Method Of Making Same", relates to forming a ribbon of multiplicity of juxtaposed optical fibers, securing the fibers along its trim across the ribbon, cutting the fibers to a certain length, and with a single line of cut flaring the fibers out to prepare the ultimate device for display.

U.S. Pat. No. 3,878,503, issued to Martin, entitled "Decorative Structure Utilizing Optical Fibers", relates to a decorative structure having an internal light source wherein light is emitted into a plurality of fibers, the fibers arranged in such a manner as to create the effect of a tree with the various end branches being optically lit therethrough.

SUMMARY OF THE PRESENT INVENTION:

The system in the present invention accomplishes the result of providing optical fiber lighting system for live Christmas trees. What is provided is a basic light source, having an internal high or low intensity light member, and at least a pair of concentric rotating shadow wheels, each of the wheels provided with a plurality of orifices therethrough for allowing light to course through the wheels. There is further provided an extruded or dipped coating fiber housing, housing a plurality of optical fibers therewithin, so that the light source, after having coursed through the wheel, travels through the group of optical fibers contained within the single housing. Further, there is provided means for allowing the various optic fibers to terminate at a fluted plastic molding that includes a base portion for mounting or clipping onto the branch of a tree. Therefore, the single housing of the plurality of optic fibers would be substantially aligned along the trunk of the tree, with the various individual optic fibers emanating therefrom, and terminating at the fluted plastic molding, which is positionable onto the end portions of tree branches. Therefore, as light is emitted from the single light source, light would travel up through the various fibers with the fluted end plastic molding glowing as a lighted figure. There may be also means for causing a flickering effect of the plastic molding, together with different colored light being emitted with the use of various colored shields or the like on the rotating wheels.

Therefore, it is a primary object of the present invention to provide a safe, yet attractive lighting system for a live Christmas tree;

It is still a further object of the present invention to provide a lighting system for a Christmas tree utilizing optic fibers terminating in a bulb molding at the various end points of the branch of the tree;

It is still a further object of the present invention to provide a lighting system for a live Christmas tree wherein the lighting system has a single high or low intensity light source away from the tree and the tree is illuminated through optic fibers to achieve the glowing effect of light bulbs; and It is still a further object of the present invention to provide further means for creating a flickering effect or coloring of the bulbs during the lighting process.

BRIEF DESCRIPTION OF THE DRAWINGS

FIG. 1 is the detailed overall view of the preferred embodiment of the system of the present invention;

FIG. 2 is an isolated cross-sectional view along lines 2—2 in FIG. 1 of the primary housing for the optic fibers in the preferred embodiment of the system in the present invention;

FIG. 3 is an isolated view of the fluted plastic molding in the preferred embodiment of the system of the present invention; and FIG. 4 is the view of the preferred embodiment of the system of the present invention housed within a live Christmas tree.

DETAILED DESCRIPTION OF THE PREFERRED EMBODIMENT

In FIG. 1 there is illustrated the preferred embodiment of the system of the present invention as illustrated by the numeral 10. As illustrated, system 10 would provide an internal high intensity light source 12 which may be a high-wattage bulb or the like, powered by an electrical source 14, the light bulb 12 housed within the container means 16 having four walls and a top portion 18 for providing containment for the light source. It should be noted that light source 12 could be a low-intensity light housing even a low wattage bulb. Also electrical source 14 could be a battery pack rather than 110 house voltage. In the preferred embodiment, the container 16 would be located at a point away from a Christmas tree so that the source of the light in the system could not be ascertained. Container or "black box" 16 would further house therewithin a pair of concentric wheels 20 and 22, the first wheel 20 rotating in the counter-clock wise direction, and wheel 22 rotating in the clockwise direction, with concentric wheels 20 and 22 having a plurality of orifices 24 therethrough so that light from source 12 may travel therethrough into the lighting system. Further, in the front wall 26 of container 16 there is included an orifice 28 which would be positioned in alignment directly behind concentric wheels 20 and 22, so that light emitted from light source 12 through the various orifices 24 in concentric wheels 20 and 22 would ultimately be emitted through orifice 28 in the direction of Arrows 30. Further attached to the outer wall 26 of container 16, there would be included an optic fiber housing 32 which would be sealably engaged around opening 28 so that any light emitted through the opening 28 would be emitted into housing 32 as seen in FIG. 1.

FIG. 2 illustrates a cross-section of housing 32 which would include a plurality of optic fibers 34 of the type having a continuous bore within optic fibers 34, the properties of optic fiber 34 being such that any light that would travel therethrough would tend to be not dispersed and would be emitted from the terminating point of each optic fiber 34 in the manner as will be discussed.

As seen further in FIG. 1, housing 32 may be attached through clippings 35 or the like along the trunk 34 of tree 36, so that the housing 32, housing the plurality of optic fibers, would travel up the trunk of the tree and would not be displayed. However, at each juncture of limbs 36 extruding from tree 34, there would be provided a secondary optic fiber housing 40, which would likewise contain a plurality of fibers 34, wherein ultimately each fiber 34 would branch out independently to provide a single light bulb effect at 42.

This independent branching of the fibers 34 is seen in FIG. 2 wherein each fiber 34 would terminate at a lighting means 42. This lighting means 42 would include a fluted plastic molding 44 which would be the terminating point of optic fiber 34. Optic fiber 34 would travel from housing 40 into a base portion 48 which would be further provided with a clip member 50 for clipping onto the body of the limb. There would be further provided an upright body portion 52 wherein the fluted end plastic molding 44 would be engaged thereinto. Therefore, as the optic fiber 34 would travel up the body member portion 52, the fiber would be dispersed into a broad "face" 46 so that light would be directed into flute plastic molding 44 and provide an overall lighting effect as seen in the figure.

Therefore, the use of the single trunk line 32 emanating into a plurality of secondary housings 40, which would ultimately result in the independent fibers 34 attached to the various fluted plastic lighting means 42, would achieve the result of having the comprehensive lighting system on the Christmas tree, whereby each branch could be provided with a lighting means 42 on its end, to give a desired effect of a candle or the like attached to the limb of the tree, yet avoid the risk of having the intense heat which would occur from a standard lighting system in a live tree.

For purposes of further use, it is foreseen that concentric wheels 22 and 24 may be provided with a transparent yet colored backing to provide a color effect to the glowing flute plastic molding 44, or yet each plastic molding 44 may be of various colors rather than clear so that the light emitting therefrom may be of a color rather than the standard lighting fixture.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. A system for illuminating live Christmas trees by the use of optic fibers, the system comprising:
   a. a tree member having a central trunk portion, further including a plurality of branches extending therefrom;

b. a light source, positioned away from the tree, for providing a source of light;

c. a walled enclosure enclosing substantially the entire light source, the enclosure including an orifice in a wall so that any light emanating from the light source emanates through the light orifice in the wall of the enclosure;

d. a first principal housing sealably attached to the wall surrounding the orifice, the housing encasing a plurality of optic fibers therein, so that the light emanating through the light orifice travels through a light carrying channel in each of the plurality of optic fibers;

e. means for directing each of the optic fibers to a position substantially along the outer perimeter of the tree branches, so that light is emanated from each of the end portions of the optic fibers; and f. a pair of rotating concentric wheels having a plurality of bores, the concentric wheels positioned between the light source and the principal housing for allowing light emanating from the light source to travel through the bores of the concentrically rotating wheels so that the light carried through the light channel is viewed as intermediate twinkling light from each of the end portions of the optic fibers along the outer perimeter of the tree.

2. The system in claim 1, wherein there is further provided means for clipping each of the glowing members at the end of the optic fibers to a stem on the tree.

3. The system in claim 1, wherein the principal housing of the optic fibers is further directed to a plurality of sub-housings which would travel along the various major limbs of the tree.

4. The system in claim 1, wherein each of the glowing members would further comprise a fluted plastic molding substantially in the shape of a flame of a candle for providing the glowing effect.

5. The system in claim 1, wherein there may be further provided means for having the glowing members glow in various shades of color.

6. The system in claim 1, wherein the light source is of high or low intensity.

7. The system in claim 1, further comprising means for supplying electrical current to the light source.

8. A system for illuminating live Christmas trees by the use of optic fibers, the system comprising:

a. a single light source, for providing a source of light, the light source contained within an enclosed walled structure, having a single orifice so that light from the light source would emanate through the single orifice in the wall of the structure;

b. a first principal housing sealably attached to the wall surrounding the orifice, the housing further including a plurality of optic fibers therein, so that the light emanating from the light source is conveyed through a light conveying channel in each of the plurality of optic fibers;

c. means for directing each optic fiber to a point substantially along the outer perimeter of the tree branches, so that a glow is produced at each of the end portions of each optic fiber;

d. a bulb member attached to each of the optic fibers for providing a glowing effect to the end of the optic fibers as the light is emanated therefrom; and e. concentric rotating wheels positioned between the light source and the first principal housing having a plurality of bores for allowing light to travel through the bores from the light source to the optic fibers to produce a glow at the end of each optic fiber but to block light travel between the bores, so that concentric rotation of the wheels produces a twinkling effect in each of the glowing bulb members.

9. The system in claim 8, wherein there is further provided means for producing various colored glows from each of the bulb members.

10. The system in claim 8, wherein each of the glowing bulb would further comprise a fluted plastic molding substantially in the shape of a flame of a candle for providing the glowing effect from the light.

11. The system in claim 8, wherein there is further provided means for producing a twinkling effect in the glowing bulb members.

12. The system in claim 8, wherein the light source could receive electrical energy from a dry cell battery

* * * * *